United States Patent
Fong et al.

(10) Patent No.: US 7,345,686 B2
(45) Date of Patent: Mar. 18, 2008

(54) METHOD AND APPARATUS FOR VISIBILITY DETERMINATION AND PROCESSING

(75) Inventors: Julian Fong, Seattle, WA (US); Wayne Wooten, Seattle, WA (US)

(73) Assignee: Pixar, Emeryville, CA (US)

( * ) Notice: Subject to any disclaimer, the term of this patent is extended or adjusted under 35 U.S.C. 154(b) by 365 days.

(21) Appl. No.: 10/846,145

(22) Filed: May 13, 2004

(65) Prior Publication Data

US 2005/0248569 A1   Nov. 10, 2005

Related U.S. Application Data

(60) Provisional application No. 60/569,293, filed on May 6, 2004.

(51) Int. Cl.
*G06T 15/40* (2006.01)
(52) U.S. Cl. ............................ 345/421; 345/426
(58) Field of Classification Search ............ None
See application file for complete search history.

(56) References Cited

U.S. PATENT DOCUMENTS 5,511,154 A * 4/1996 Johnson et al. ............ 345/532

OTHER PUBLICATIONS

Cook, R., Carpenter, L., Catmull, E., The Reyes Image Rendering Architecture, Jul. 1987, ACM Computer Graphics, vol. 21, No. 4, pp. 95-102.*
Keith, S., The RenderMan Interface, Sep. 1989, ACM SIGGRAPH '95, Version 3.1, pp. 109-113.*

* cited by examiner

*Primary Examiner*—Ulka Chauhan
*Assistant Examiner*—Said Broome
(74) *Attorney, Agent, or Firm*—Towmsend and Townsend and Crew LLP (57) ABSTRACT

A method and apparatus for visibility determination and processing. The method includes receiving at least information associated with a plurality of objects, generating a first plurality of geometric primitives based on at least information associated with the plurality of objects, generating a first plurality of grids based on at least information associated with the first plurality of geometric primitives, and shading the first plurality of grids. The generating a first plurality of grids includes generating a second plurality of grids associated with the first plurality of geometric primitives, selecting a third plurality of grids from the second plurality of grids, and selecting the first plurality of grids from the third plurality of grids.

44 Claims, 6 Drawing Sheets

METHOD AND APPARATUS FOR VISIBILITY DETERMINATION AND PROCESSING

CROSS-REFERENCES TO RELATED APPLICATIONS

This application claims priority to U.S. Provisional Patent Application No. 60/569,293, filed May 6, 2004, entitled "Method and Apparatus for Visibility Determination and Processing," commonly assigned, incorporated by reference herein for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates in general to computer animation techniques. More particularly, the invention provides a method and system for visibility determination and processing. Merely by way of example, the invention is described as it applies to a rendering process, but it should be recognized that the invention has a broader range of applicability.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" and "Fantasia" (1940). This animation technique typically required artists to hand-draw or paint animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and "Clash Of The Titans" (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar. Pixar developed both computing platforms specially designed for CAA, and animation software now known as RenderMan®. RenderMan® was particularly well received in the animation industry and recognized with two Academy Awards®. RenderMan® software is used to convert graphical specifications of objects and convert them into one or more images. This technique is known generally in the industry as rendering.

In a rendering process, for example, certain geometric primitives are bounded by bounding boxes. These bounding boxes are usually sorted from front to back with respect to an image plane. Based on the order of the bonding boxes, the respective geometric primitives are processed with an occlusion buffer. The occlusion buffer facilitates the rendering of the primitives onto the image plane.

For example, a list of geometric primitives is sorted from front to back based on locations of their respective bounding boxes. The geometric primitive first in the list is diced into a grid which is then shaded. After the grid is shaded, z values of its micropolygons are stored in an occlusion buffer. The stored information is organized according to locations of the projected images of the micropolygons on the image plane. For example, the occlusion buffer has a resolution equal to the pixel subsample resolution. The z values represent distances of these micropolygons to the image plane. If there is no visible micropolygon corresponding to a given location of the image plane, the occlusion buffer stores a value of infinity for this given location.

After location information of the first primitive is stored in the occlusion buffer, other geometric primitives are processed. For these geometric primitives, occlusion culling may be performed. The occlusion culling would discard a geometric primitive under certain conditions. As discussed above, the geometric primitive is surrounded by a bounding box, and this bounding box has a projected image on the image plane. The location of the projected image may overlap with certain locations on the image plane that have corresponding z values stored in the occlusion buffer. If all these corresponding z values are smaller than the minimum z value of the bounding box, the geometric primitive is not visible. The geometric primitive is then discarded without dicing and shading. If one or more of these corresponding z values are larger than the minimum z value of the bounding box, the one or more z values are updated and the geometric primitive is diced and shaded.

To speed up the visibility determination and processing, a simple hierarchy can be introduced to the occlusion buffer. For example, the hierarchy includes two occlusion buffers. One has the pixel resolution, and the other has the bucket resolution. A bucket usually refers to a portion of a frame. The buffer with pixel resolution stores the minimum z values of all subpixels within a pixel, while the buffer with bucket resolution stores the minimum z values of all pixels within a bucket. These two occlusion buffers can speed up the visibility determination and processing. For example, a geometric primitive has a bounding box with a minimum z value. If the minimum z value is greater than all the corresponding z values in the buffer with bucket resolution, the geometric primitive can be determined to be invisible without comparing with any z values in the occlusion buffer with pixel resolution.

Additionally, the efficiency of the occlusion buffer is improved by the tentative hiding technique. The tentative hiding technique includes busting the grid of a geometric primitive into micropolygons and hit testing the micropolygons immediately prior to shading. If any of the micropolygons are sampled, the grid is considered to be visible. The grid is then shaded and turned into colored micropolygons. If the entire list of micropolygons remains unsampled during hit testing, the grid is fully occluded.

Even with tentative hiding, the occlusion buffer technique still sorts geometric primitives from front to back based on locations of bounding boxes. The bounding boxes are usually loose around the geometric primitives. For example, some geometric primitives occluding each other may have loose bounding boxes that overlap, or may be sorted in the wrong order. Thus geometric primitives that are occluded by other primitives behind them in the sorted list may be rendered first, thus wasting shading efforts.

Hence it is highly desirable to improve techniques for visibility determination and processing in rendering processes.

BRIEF SUMMARY OF THE INVENTION

The present invention relates in general to computer animation techniques. More particularly, the invention provides a method and system for visibility determination and processing. Merely by way of example, the invention is described as it applies to a rendering process, but it should be recognized that the invention has a broader range of applicability.

According to one embodiment of the present invention, a method for rendering a plurality of objects includes receiving at least information associated with a plurality of objects, generating a first plurality of geometric primitives based on at least information associated with the plurality of objects, generating a first plurality of grids based on at least information associated with the first plurality of geometric primitives, and shading the first plurality of grids. The generating a first plurality of grids includes generating a second plurality of grids associated with the first plurality of geometric primitives. The second plurality of grids includes a first plurality of micropolygons. Additionally, the generating a first plurality of grids includes selecting a third plurality of grids from the second plurality of grids based on at least information associated with the first plurality of micropolygons and a first buffer state related to a buffer. The third plurality of grids includes a second plurality of micropolygons. The selecting a third plurality of grids includes updating the buffer from the first buffer state to a second buffer state. Moreover, the generating a first plurality of grids includes selecting the first plurality of grids from the third plurality of grids based on at least information associated with the second buffer state and the second plurality of micropolygons.

According to another embodiment of the present invention, a method for determining visibility of a plurality of objects includes processing information associated with a first plurality of geometric primitives, and generating a first plurality of grids associated with the first plurality of geometric primitives. The first plurality of grids includes a first plurality of micropolygons. Additionally, the method includes processing information associated with the first plurality of grids, performing displacement shading to the first plurality of grids if a predetermined condition is satisfied, and selecting a second plurality of grids from the first plurality of grids based on at least information associated with the first plurality of micropolygons and a first buffer state related to a buffer. The second plurality of grids includes a second plurality of micropolygons. The selecting a second plurality of grids includes updating the buffer from the first buffer state to a second buffer state. Moreover, the method includes selecting a third plurality of grids from the second plurality of grids based on at least information associated with the second buffer state and the second plurality of micropolygons.

According to yet another embodiment of the present invention, a computer program product includes a computer-readable medium including instructions for rendering a plurality of objects. The computer-readable medium comprises one or more instructions for receiving at least information associated with a plurality of objects, one or more instructions for generating a first plurality of geometric primitives based on at least information associated with the plurality of objects, one or more instructions for generating a first plurality of grids based on at least information associated with the first plurality of geometric primitives, and one or more instructions for shading the first plurality of grids. The one or more instructions for generating a first plurality of grids include one or more instructions for generating a second plurality of grids associated with the first plurality of geometric primitives. The second plurality of grids including a first plurality of micropolygons. Additionally, the one or more instructions for generating a first plurality of grids include one or more instructions for selecting a third plurality of grids from the second plurality of grids based on at least information associated with the first plurality of micropolygons and a first buffer state related to a buffer. The third plurality of grids includes a second plurality of micropolygons. Moreover, the one or more instructions for generating a first plurality of grids include one or more instructions for selecting a third plurality of grids including one or more instructions for updating the buffer from the first buffer state to a second buffer state, and one or more instructions for selecting the first plurality of grids from the third plurality of grids based on at least information associated with the second buffer state and the second plurality of micropolygons.

According to yet another embodiment of the present invention, a computer program product including a computer-readable medium including instructions for determining visibility of a plurality of objects. The computer-readable medium comprises one or more instructions for processing information associated with a first plurality of geometric primitives, and one or more instructions for generating a first plurality of grids associated with the first plurality of geometric primitives. The first plurality of grids includes a first plurality of micropolygons. Additionally, the computer-readable medium includes one or more instructions for processing information associated with the first plurality of grids, one or more instructions for performing displacement shading to the first plurality of grids if a predetermined condition is satisfied, and one or more instructions for selecting a second plurality of grids from the first plurality of grids based on at least information associated with the first plurality of micropolygons and a first buffer state related to a buffer. The second plurality of grids includes a second plurality of micropolygons. The one or more instructions for selecting a second plurality of grids include updating the buffer from the first buffer state to a second buffer state. Moreover, the computer-readable medium includes one or more instructions for selecting a third plurality of grids from the second plurality of grids based on at least information associated with the second buffer state and the second plurality of micropolygons.

According to yet another embodiment of the present invention, a system for rendering a plurality of objects includes a processing system configured to receive at least information associated with a plurality of objects, generate a first plurality of geometric primitives based on at least information associated with the plurality of objects, generate a first plurality of grids based on at least information associated with the first plurality of geometric primitives, and shade the first plurality of grids. The generate a first plurality of grids includes generate a second plurality of grids associated with the first plurality of geometric primitives. The second plurality of grids includes a first plurality of micropolygons. Additionally, the generate a first plurality of grids includes select a third plurality of grids from the second plurality of grids based on at least information associated with the first plurality of micropolygons and a first buffer state related to a buffer. The third plurality of grids includes a second plurality of micropolygons. The select a third plurality of grids includes update the buffer from the first buffer state to a second buffer state. Moreover, the generate a first plurality of grids includes select the first plurality of grids from the third plurality of grids based on at least information associated with the second buffer state and the second plurality of micropolygons.

According to yet another embodiment of the present invention, a system for determining visibility of a plurality of objects includes a processing system configured to process information associated with a first plurality of geometric primitives, and generate a first plurality of grids associated with the first plurality of geometric primitives. The first plurality of grids includes a first plurality of micropolygons. Additionally, the processing system is further configured to process information associated with the first plurality of grids, perform displacement shading to the first plurality of grids if a predetermined condition is satisfied, and select a second plurality of grids from the first plurality of grids based on at least information associated with the first plurality of micropolygons and a first buffer state related to a buffer. The second plurality of grids includes a second plurality of micropolygons. The select a second plurality of grids includes update the buffer from the first buffer state to a second buffer state. Moreover, the processing system is further configured to select a third plurality of grids from the second plurality of grids based on at least information associated with the second buffer state and the second plurality of micropolygons.

Many benefits are achieved by way of the present invention over conventional techniques. Certain embodiments of the present invention speed up the rendering process by improving the determination of visible surfaces. Some embodiments of the present invention reduce shading calculations which do not ultimately contribute to the final rendered image. Certain embodiments of the present invention provide an algorithm that can improve efficiency in a bucket-based renderer. The algorithm analyzes the results from the first tentative hiding, and preserves the grid to avoid redundant work. Some embodiments of the present invention hide all the geometric primitives in front-to-back order, hit test some or all of the geometric primitives for the first time, write their depth values into the occlusion buffer under certain conditions, and hit test some or all of the same geometric primitives for a second time. Certain embodiments of the present invention greatly improve the efficacy of hiding. For example, the second occlusion test and the second hit test use the depth values in the depth buffer, which was updated during the first occlusion test and the first hit test. Some embodiments of the present invention can improve the accuracy of visibility determination by running the displacement shader before the first hit testing, the second occlusion test, and the second hit testing. Performing certain embodiments of the present invention significantly reduce the maximum micropolygon footprint. The micropolygon lifespan is shortened and the grid lifespan is lengthened. Grids are more compact representations than micropolygons, and memory footprints may be improved. Some embodiments of the present invention improve efficiency of tentative hiding of multiple grids. The multiple grids each undergo the first hit testing. Combining grids that may have otherwise occluded each other and would have been needlessly shaded can be avoided. The grids that do not occlude each other may be combined and shaded all at once.

Various additional objects, features and advantages of the present invention can be more fully appreciated with reference to the detailed description and accompanying drawings that follow.

DETAILED DESCRIPTION OF THE INVENTION

The present invention relates in general to computer animation techniques. More particularly, the invention provides a method and system for visibility determination and processing. Merely by way of example, the invention is described as it applies to a rendering process, but it should be recognized that the invention has a broader range of applicability.

Figure 1:
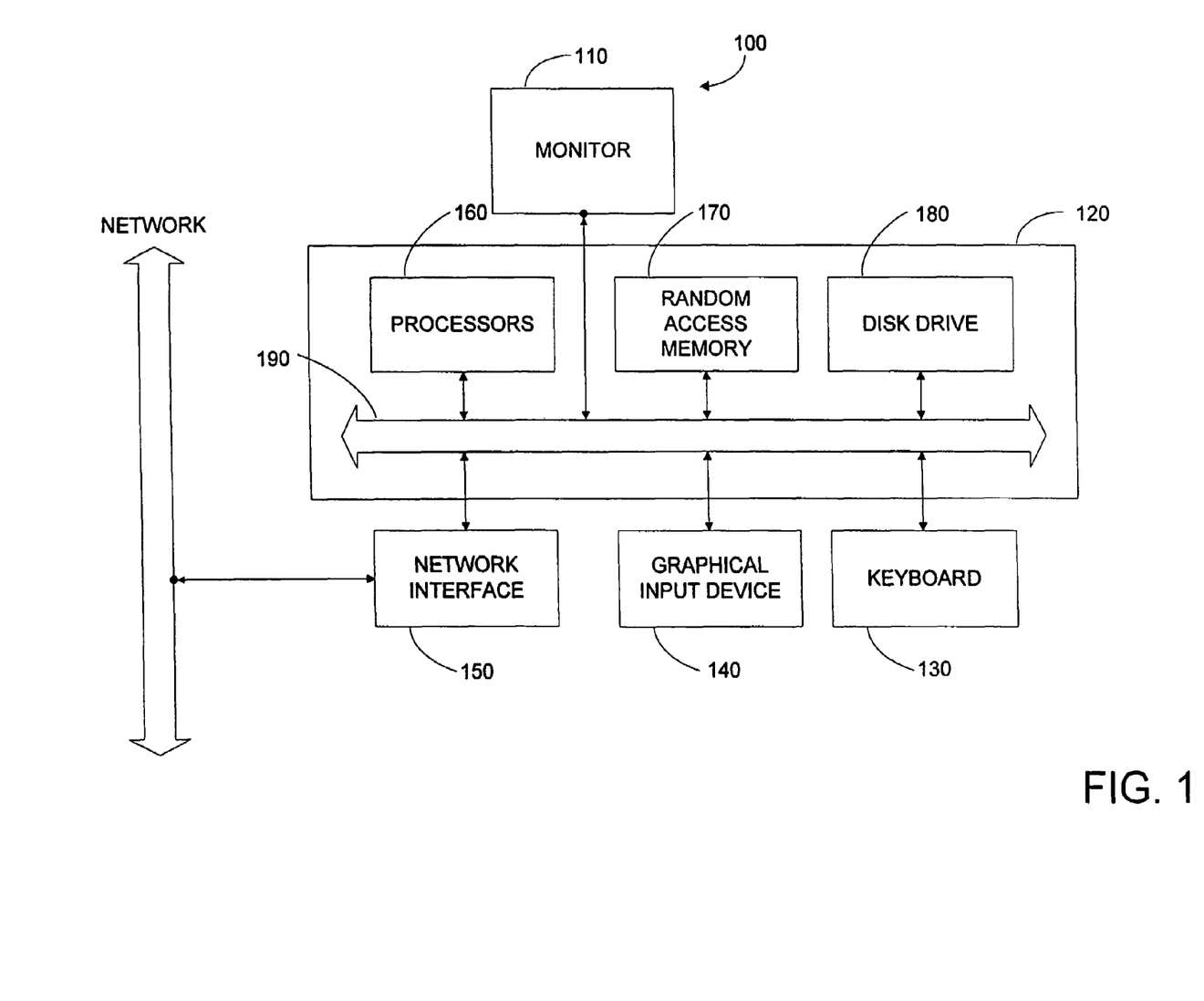
FIG. 1 illustrates a block diagram of a rendering system according to one embodiment of the present invention.

FIG. 1 is a simplified computer rendering system according to an embodiment of the present invention. This diagram is merely an example, which should not unduly limit the scope of the claims. One of ordinary skill in the art would recognize many variations, alternatives, and modifications. The computer system 100 includes a monitor 110, a computer 120, a keyboard 130, a user input device 140, a network interface 150.

The user input device 140 is embodied as a computer mouse, a trackball, a track pad, wireless remote, and the like. The user input device 140 allows a user to select objects, icons, text and the like that appear on the monitor 110.

The network interface 150 includes one or more of an Ethernet card, a modem (telephone, satellite, cable, ISDN), (asynchronous) digital subscriber line (DSL) unit, and the like. The network interface 150 is usually coupled to a computer network as shown. In other embodiments, the network interface 150 may be physically integrated on the motherboard of the computer 120, may be a software program, such as soft DSL, or the like.

The computer 120 includes computer components such as a processor 160, and memory storage devices, such as a random access memory (RAM) 170, a disk drive 180, and a system bus 190 interconnecting the above components. In another embodiment, the computer 120 is a PC compatible computer having multiple microprocessors such as Xeon™ microprocessor from Intel Corporation. The computer 120 usually includes a UNIX-based operating system.

The RAM 170 and the disk drive 180 are examples of tangible media for storage of data, audio/video files, computer programs, embodiments of the herein described invention including scene descriptors, object data files, shader descriptors, a rendering engine, output image files, texture maps, displacement maps, object pose data files, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

The computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

As discussed above and further emphasized here, FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2:
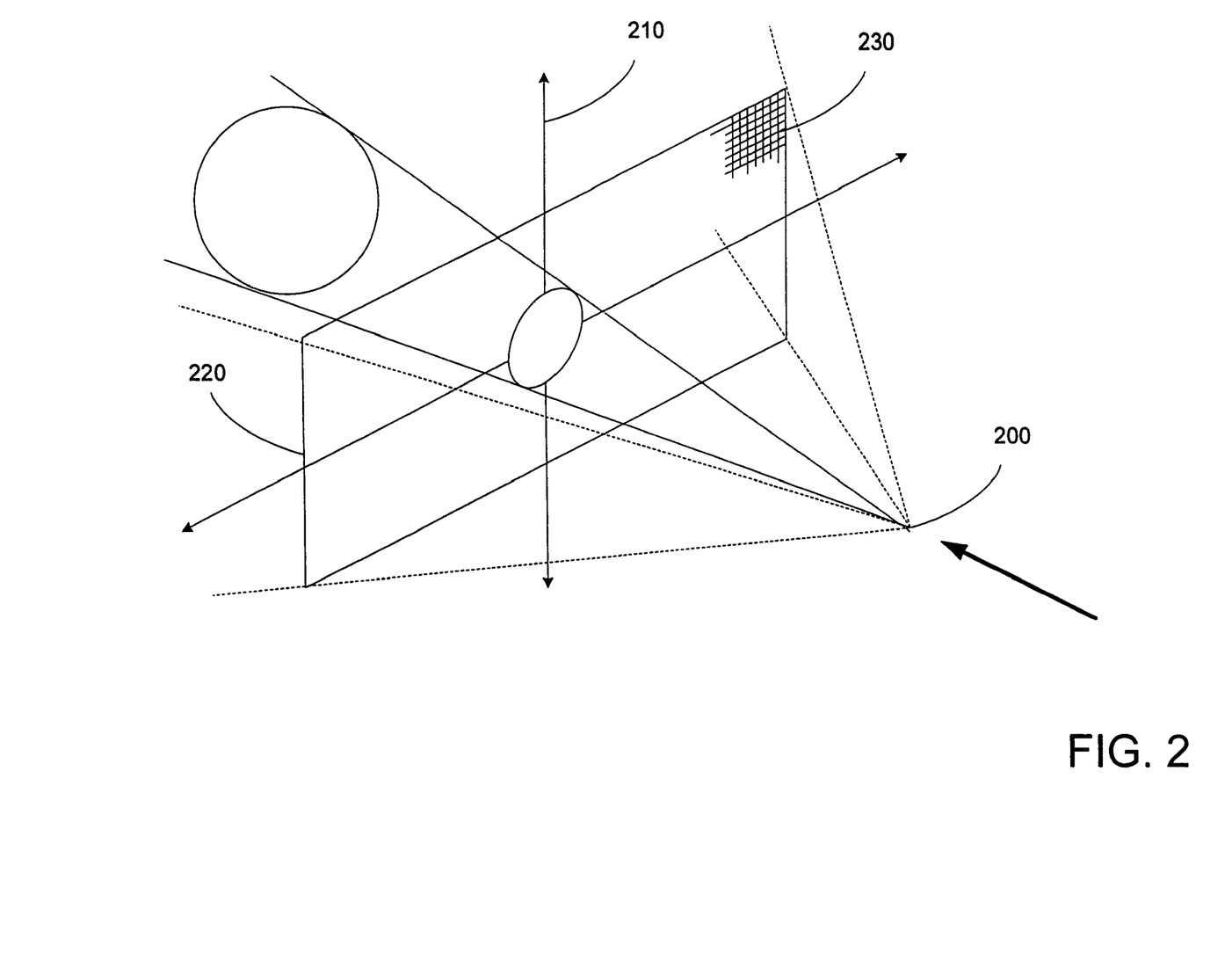
FIG. 2 is a diagram illustrating terms used in the present application.

FIG. 2 is a diagram illustrating terms used in the present application. In particular, as illustrated, a virtual camera 200 is defined for each image. Virtual camera 200 is associated with an image plane 210, which defines the two dimensional plane where the image will be recorded to. From image plane 210, a screen window 220 is defined that defines the outer bounds of the image to be rendered. Pixel locations 230 are then defined within screen window 220. The screen window 220 can be subdivided into a series of buckets, each of which may include a plurality of pixels. In one embodiment of the present invention, the screen window 220 has a pixel resolution of 2000 horizontal pixels and 1000 vertical pixels. In other embodiments of the present invention, a higher or lower pixel resolution in the horizontal or vertical direction is envisioned.

Figure 3A:
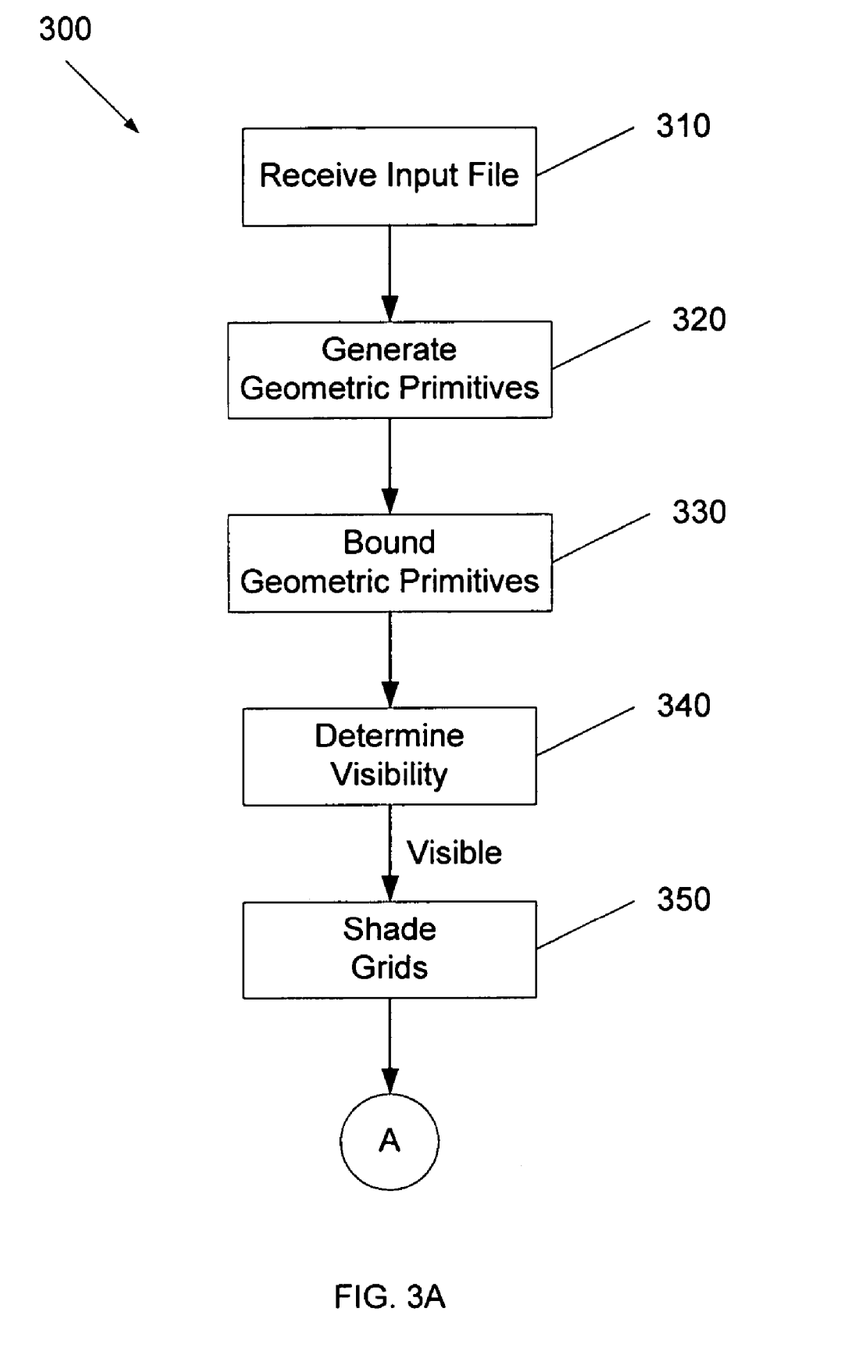
FIGS. 3A and 3B are a simplified rendering method according to an embodiment of the present invention.
Figure 3B:
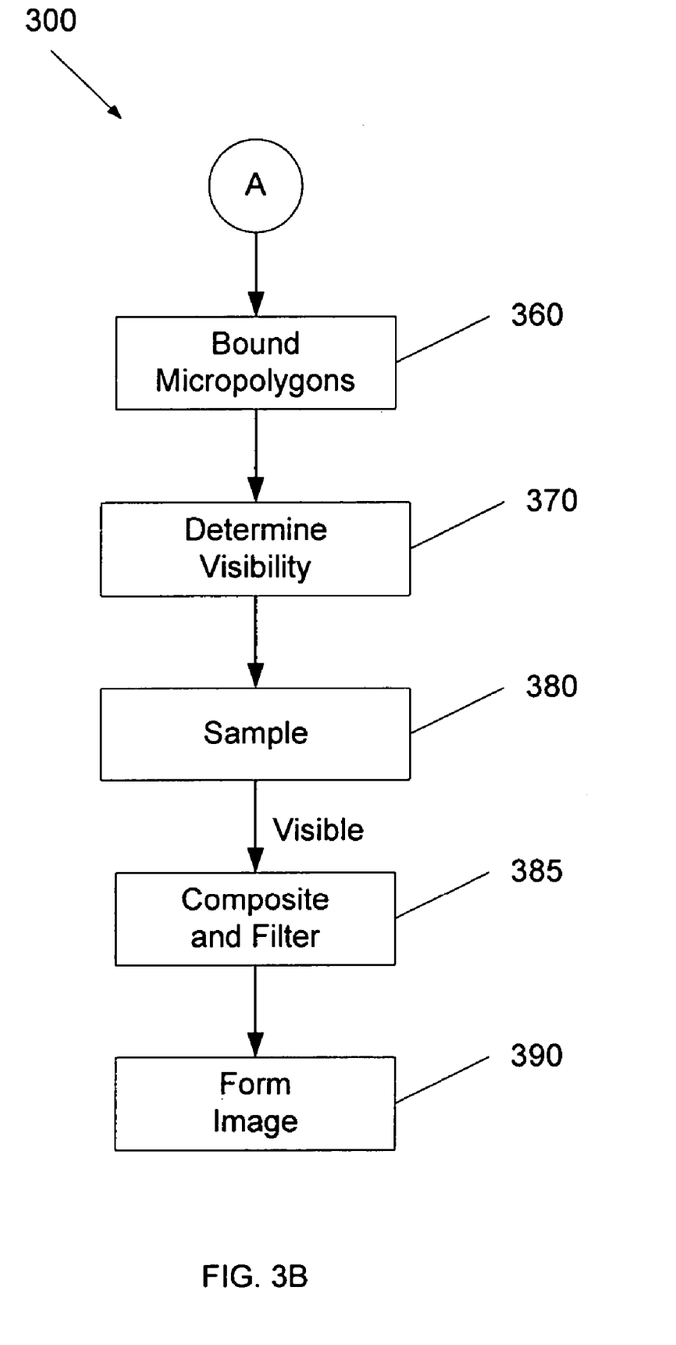

FIGS. 3A and 3B are a simplified rendering method according to an embodiment of the present invention. These diagrams are merely examples, which should not unduly limit the scope of the claims. One of ordinary skill in the art would recognize many variations, alternatives, and modifications. The rendering method 300 includes a process 310 for receiving an input file, a process 320 for generating geometric primitives, a process 330 for bounding geometric primitives, a process 340 for determining visibility, a process 350 for shading grids, a process 360 for bounding micropolygons, a process 370 for determining visibility, a process 380 for sampling, a process 385 for compositing and filtering, and a process 390 for forming image. Although the above has been shown using a selected sequence of processes, there can be many alternatives, modifications, and variations. For example, some of the processes may be expanded and/or combined. Other processes may be inserted to those noted above. Depending upon the embodiment, the specific sequences of processes may be interchanged with others replaced. Further details of these processes are found throughout the present specification and more particularly below.

At the process 310, an input file is received. The input file contains specifications of images to be rendered. For example, the image specifications include the specification of one or more scene backgrounds, the geometric and texture specification of objects in the images, the specification of object placement data, displacement maps, and the like. The geometric specification may include geometric boundaries of the objects. In another example, the image specifications include information related to the virtual camera 200, the image plane 210, the screen window 220, and objects to be rendered onto the image plane 210. The information may include locations, orientations, and shapes of these objects. Usually, the image specifications are generated by one or more animators using conventional three-dimensional modeling techniques. For example, software such as Alias|Wavefront's Maya™ Software, and the like may be used to specify the scene.

At the process 320, geometric primitives are generated. For example, the geometric primitives includes one or more of a general planar concave polygon with hole, a planar convex polygon, a collection of planar convex or general planar concave polygons with holes which share vertices ("polyhedra"), a bicubic patch and patch mesh with an arbitrary basis, a bilinear patch and patch mesh, a non-uniform rational B-spline surface of arbitrary degree (NURB), a disk, a tori, and a quadric surface.

At the process 330, the geometric primitives are bounded with bounding boxes. Each bounding box is sandwiched between two surfaces parallel to the image plane. One surface corresponds to the minimum z value of the bounding box, and the other corresponds to the maximum z value of the bounding box. The z values measure the distances between the surfaces to the image plane respectively.

At the process 340, the visibility of the geometric primitives is determined at the grid level. For example, the geometric primitives are diced into grids. The grids are modified with the displacement maps under certain conditions. If a grid is occluded, the grid is either culled or pushed to another bucket. At the process 350, the visible grids are shaded. For example, the surface shader defines how surfaces of the objects interact with the light.

At the process 360, certain micropolygons are bounded. For example, the shaded grids are busted into micropolygons. The micropolygons are bounded with bounding boxes, and the bounding boxes are used to determine whether the micropolygons extend into another bucket.

At the process 370, the visibility of micropolygons is determined. For example, the micropolygons are bounded by their respective bounding boxes. The bounding box associated with each micropolygon has a projected image on the image plane. The location of the projected images may overlap with certain locations on the image plane that have corresponding z values stored in the occlusion buffer. If all these corresponding z values are smaller than the minimum z value of the bounding box, the micropolygon is considered occluded. If a micropolygon is occluded, it is culled. At the process 380, the visible micropolygons are sampled. For example, a stochastic sampling is performed in order to determine rendering parameters for each pixel. The stochastic sampling may use a jittering process and generates supersamples. The supersamples contain information associated with color and opacity. If no samples are generated the micropolygon is considered to be not visible and is culled. At the process 385, the samples are composited and filtered for each pixel. For example, the supersamples are averaged with various weights as defined by a filter. At the process 390, an image is formed with pixels.

Figure 4A:
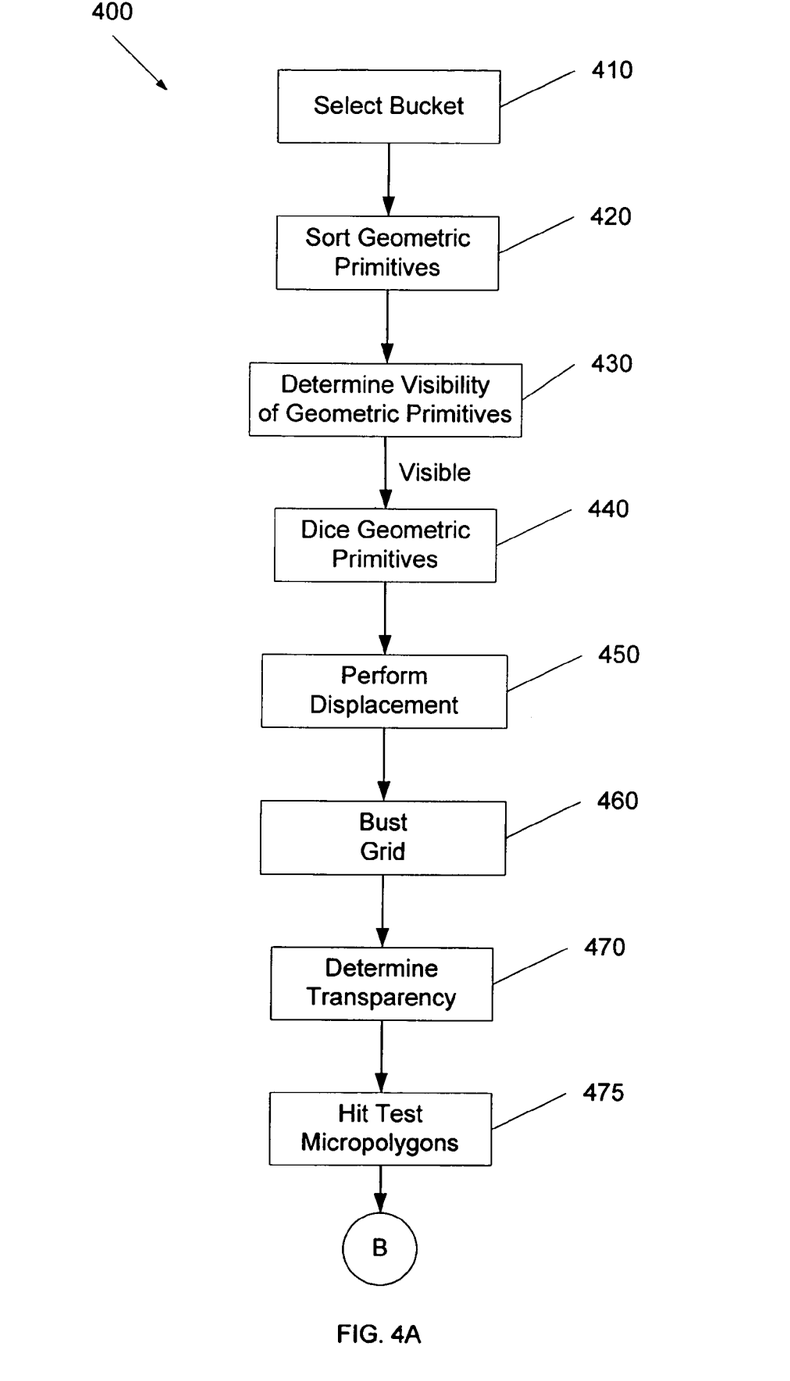
FIGS. 4A and 4B are a simplified method for visibility determination and processing according to an embodiment of the present invention.
Figure 4B:
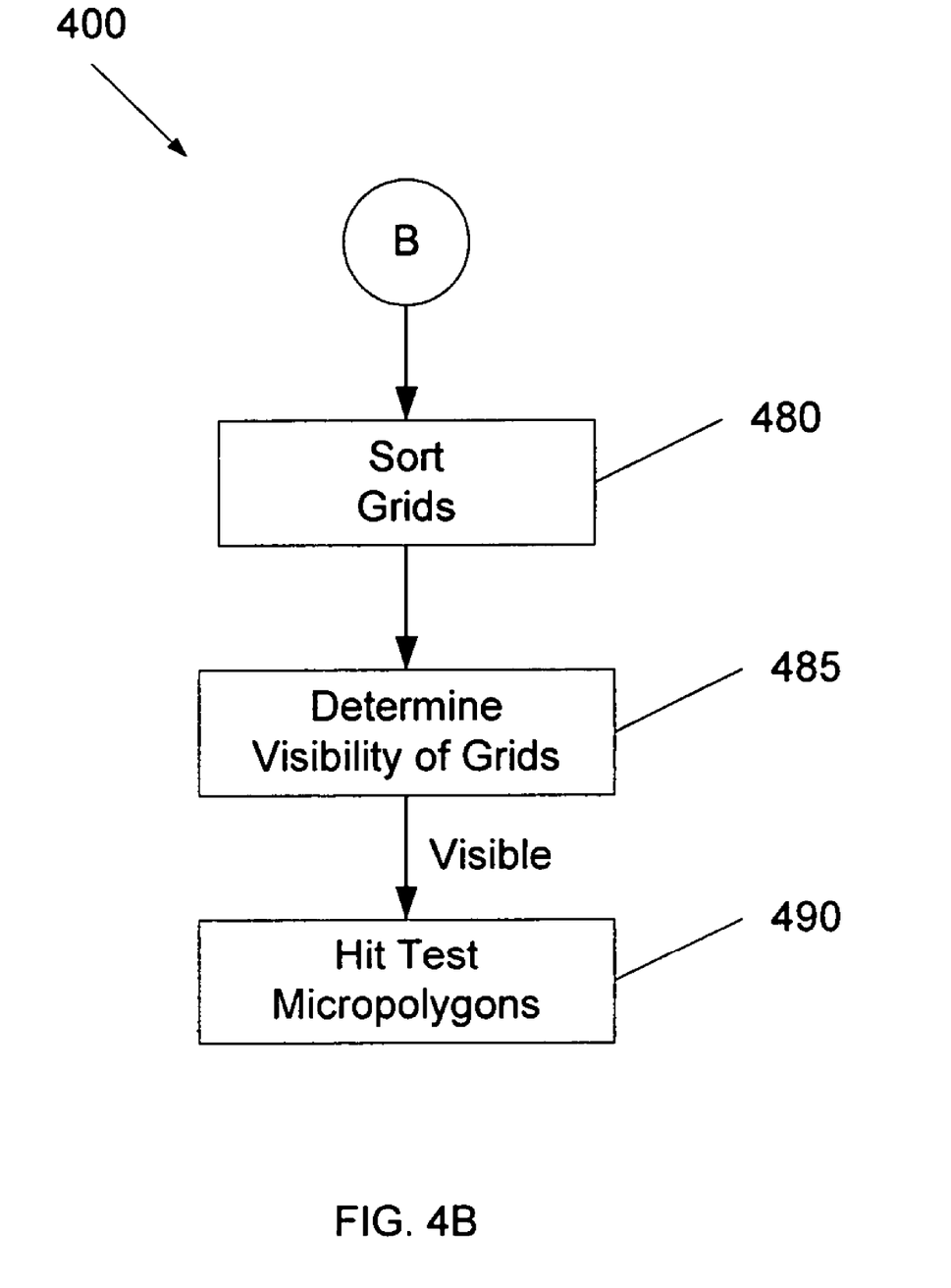

FIGS. 4A and 4B are a simplified method for visibility determination and processing according to an embodiment of the present invention. These diagrams are merely examples, which should not unduly limit the scope of the claims. One of ordinary skill in the art would recognize many variations, alternatives, and modifications. The method 400 includes a process 410 for selecting a bucket, a process 420 for sorting geometric primitives, a process 430 for determining visibility of geometric primitives, a process 440 for dicing geometric primitives, a process 450 for performing displacement, a process 460 for busting a grid, a process 470 for determining transparency, a process 475 for hit testing micropolygons, a process 480 for sorting grids, a process 485 for determining visibility of grids, and a process 490 for hit testing micropolygons. Although the above has been shown using a selected sequence of processes, there can be many alternatives, modifications, and variations. For example, some of the processes may be expanded and/or combined. Other processes may be inserted to those noted above. Depending upon the embodiment, the specific sequences of processes may be interchanged with others replaced. The method 400 may be used as the process 340 for determining visibility of the rendering method 300. Further details of these processes are found throughout the present specification and more particularly below.

At the process 410, a bucket is selected. A bucket is usually a small portion of an image frame. In one embodiment, the shading list for the selected bucket is cleared. At the process 420, the geometric primitives are sorted. The geometric primitives have projected images on the image plane which overlap with the selected bucket. The sorting includes bounding the geometric primitives by bounding boxes and sorting the geometric primitives from front to back with respect to the image plane based on locations of their respective bounding boxes.

At the process 430, visibility of the geometric primitives is determined according to the sorted order of primitives. For example, the geometric primitive with a bounding box closest to the image plane is processed first, and the geometric primitive with a bounding box farthest to the image plane is processed last. The bounding box of each geometric primitive has a projected image on the image plane. The location of the projected images may overlap with certain locations on the image plane that have corresponding z values stored in the occlusion buffer. If all these corresponding z values are smaller than the minimum z value of the bounding box, the geometric primitive is considered not visible. If one or more of these corresponding z values are larger than the minimum z value of the bounding box, the geometric primitive is considered visible.

In one embodiment of the present invention, the occluded geometric primitive is discarded without dicing and shading. In another embodiment of the present invention, the occluded geometric primitive is analyzed to determine whether the primitive extends into one or more of other buckets. If the geometric primitive extends into another bucket, the information associated with the primitive is provided for the analysis of the another bucket; otherwise the geometric primitive is discarded.

At the process 440, the geometric primitives deemed visible at the process 430 are diced under certain conditions. Each of the geometric primitives is analyzed to determine whether the primitive is flat. If the primitive is not flat, the primitive is diced into a grid and sends to the process 450. If the primitive is flat, it is split into new primitives. If a new primitive overlaps with the bucket, the new primitive is sent back to the process 420. If the new primitive does not overlap with the bucket, the primitive is pushed to a bucket that overlaps with the primitive. Whether a primitive is flat usually depends on whether the primitive is too large. If the primitive is too large, dicing may produce a grid with an undesirably large number of micropolygons with various sizes.

At the process 450, the displacement shading is performed under certain condition. If the condition is not met, the displacement shading is not performed for the given grid. For example, the condition includes whether the displacement shading can be performed independently from the surface shading. If the condition is met, the displacement shading is performed. With displacement shading, an object surface can be given small geometric details, such as bumps, grooves, crust, roughness, or even a pattern. In one example, the displacement shader binding is removed after the displacement shading in order to avoid running the displacement shader more than once.

At the process 460, the grid is busted into micropolygons. For example, the micropolygons are quadrilaterals with various sizes. At the process 470, the transparency of the grid is determined. Regardless of whether the grid is transparent, the grid and its associated micropolygons are passed to the next stage.

At the process 475, hit testing is performed to determine visibility of the grid. For example, the micropolygons related to the grid are bounded by their respective bounding boxes. The bounding box associated with each micropolygon has a projected image on the image plane. The location of the projected images may overlap with certain locations on the image plane that have corresponding z values stored in the occlusion buffer. If all these corresponding z values are smaller than the minimum z value of the bounding box, the micropolygon is considered occluded. If all of its micropolygons are determined to be occluded during hit testing, the grid is considered to be fully occluded. If any of its micropolygons are determined to be visible, the grid is considered to be visible and passed to the process 480. If the grid is transparent, the location of the visible micropolygon is not used to update the occlusion buffer. In one example, the hit testing is stopped after anyone of the micropolygons is determined to be visible. If the grid associated with the micropolygons is not transparent, all of its micropolygons are tested. The locations of the visible micropolygons are used to update the occlusion buffer.

If the grid is fully occluded, the grid is analyzed to determine whether the grid extends outside the current bucket. If the grid does not extend outside the current bucket, the grid and its associated geometric primitive are deleted. If the grid extends to another bucket, it is determined whether the grid is too large. A grid that is too large may produce, after dicing, an undesirably large number of micropolygons with various sizes. If the grid is not too large, the grid is pushed to the another bucket. If the grid is too large, the grid is passed to the process 480. In another example, the process of determining whether the grid is too large is skipped. Any grid that extends to another bucket is pushed to the another bucket.

At the process 480, the grids passed from the previous stage are sorted. The grids are associated with their respective geometric primitives, and the geometric primitives are bounded by bounding boxes. The sorting of the grids uses the locations of their corresponding bounding boxes and lists the grids from front to back with respect to the image plane.

At the process 485, visibility of the grids is determined according to the sorted order of grids. For example, the grid associated with a bounding box closest to the image plane is processed first, and the grid associated with a bounding box farthest to the image plane is processed last. The bounding box associated with each grid has a projected image on the image plane. The location of the projected images may overlap with certain locations on the image plane that have corresponding z values stored in the occlusion buffer. If all these corresponding z values are smaller than the minimum z value of the bounding box, the grid is considered not visible. If one or more of these corresponding z values are larger than the minimum z value of the bounding box, the grid is considered visible and passed to the process 490.

In one embodiment of the present invention, the occluded grid is discarded without dicing and shading. In another embodiment of the present invention, the occluded grid is analyzed to determine whether the grid extends into one or more of other buckets. If the grid extends into another bucket, the information associated with the grid is provided for the analysis of the another bucket; otherwise the grid and its associated geometric are discarded.

At the process 490, hit testing is performed to verify visibility of the grid. The grid is associated with micropolygons. For example, the micropolygons are bounded by their respective bounding boxes. The bounding box associated with each micropolygon has a projected image on the image plane. The location of the projected images may overlap with certain locations on the image plane that have corresponding z values stored in the occlusion buffer. If all these corresponding z values are smaller than the minimum z value of the bounding box, the micropolygon is considered occluded. If all of its micropolygons are determined to be occluded during hit testing, the grid is considered to be fully occluded. The occluded grid is analyzed to determine whether the grid extends into one or more of other buckets. If the grid extends into another bucket, the information associated with the grid is provided for the analysis of the another bucket; otherwise the grid and its associated geometric primitive are discarded. If any of its micropolygon is visible, the grid is considered to be visible. If the grid is transparent, in one embodiment, the location of the visible micropolygon is not used to update the occlusion buffer. In another embodiment, the location of the visible micropolygon is used to update the occlusion buffer. For example, the occlusion buffer is updated to take into account the attenuation of light intensity through the transparent grid. In yet another embodiment, the hit testing is stopped after anyone of the micropolygons is determined to be visible. In yet another embodiment, the hit testing is performed to all micropolygons regardless of whether a micropolygon has already been determined to be visible. If the grid associated with the micropolygons is not transparent, the locations of the visible micropolygons are used to update the occlusion buffer. In one embodiment of the present invention, the visible grid is compiled into the shading list of the current bucket and passed to the process 350 for shading grids.

As discussed above and further emphasized here, FIGS. 3A, 3B, 4A and 4B are merely examples, which should not unduly limit the scope of the claims. One of ordinary skill in the art would recognize many variations, alternatives, and modifications. One embodiment of the present invention performs the full two pass hiding implementation. In the first pass, geometric primitives in the selected bucket are tested for occlusion with an occlusion buffer. The visible geometric primitives are then diced in grids. The grids are modified by the displacement shading under certain condition. For example, the displacement shading is performed by the displacement shader, independent of the surface shader. The displacement shading allows their depth contributions to be placed into the occlusion buffer and improves occlusion culling for grids behind the modified grids. The grids are tentatively hidden against the cumulative results in the occlusion buffer. The transparent grids are usually not considered for filling the occlusion buffer in the first pass of hit testing, but the transparent grids can still be subject to tentative hiding. Some transparent grids may be occluded by other grids which were processed. In the second pass the same diced grids that pass the first tentative hiding test are tentatively hidden again. The grids which pass this second occlusion test may be shaded.

For both of the tentative hiding tests, the occlusion testing may be driven down to the sample level, after the z values have been determined. The testing at the sample level may allow tentative hiding against the clipping planes and improves occlusion efficiency. As discussed above, the displacement shading may be performed before the first tentative hiding test under certain condition. For example, the displacement shading is sometimes performed by the surface shader and not the displacement shader, or the displacement shader cannot be run independently from the surface shader. In either of these two scenarios, the displacement shading is not performed prior to the first tentative hiding test.

As discussed above, certain processes such as the processes 475 and 485 may determine whether a grid extends to another bucket and push the grid to the another bucket under certain conditions. In one embodiment, pushing the grid includes wrapping the grid into a new geometric primitive other than the original geometric primitive that was diced into the grid. Pushing the new geometric primitive can avoid the repeated redicing. For the other bucket, the grid can be obtained directly from the geometric primitive list and busted for tentative hiding. In another embodiment, the grid is pushed without being wrapped into a new geometric primitive. Also as discussed above, certain processes such as the processes 430, 440, 475 and 485 may push the geometric primitive or the grid to another bucket. If the geometric primitive or the grid extends to several other buckets, the primitive or the grid is pushed to these other buckets in the order from top to bottom and from left to right. For example, the primitive or the grid is pushed first to the leftmost and uppermost bucket, secondly to the leftmost and second uppermost bucket, . . . , and finally to the lowermost and rightmost bucket.

The present invention has various advantages. Certain embodiments of the present invention speed up the rendering process by improving the determination of visible surfaces. Some embodiments of the present invention reduce shading calculations which do not ultimately contribute to the final rendered image. Certain embodiments of the present invention provide an algorithm that can improve efficiency in a bucket-based renderer. The algorithm analyzes the results from the first tentative hiding, reuses the occlusion buffer, and preserves the grid to avoid redundant work. Some embodiments of the present invention hide all the geometric primitives in front-to-back order, hit test some or all of the geometric primitives for the first time, write their depth values into the occlusion buffer under certain conditions, and hit test some or all of the same geometric primitives for a second time. Certain embodiments of the present invention greatly improve the efficacy of hiding. For example, the second occlusion test such as the process 485 and the second hit test such as the process 490 use the depth values in the depth buffer, which was updated during the first occlusion test such as the process 430 and the first hit test such as the process 475. Some embodiments of the present invention can improve the accuracy of visibility determination by running the displacement shader before the first hit testing such as the process 475, the second occlusion test such as the process 485, and the second hit testing such as the process 490. Performing certain embodiments of the present invention significantly reduce the maximum micropolygon footprint. The micropolygon lifespan is shortened and the grid lifespan is lengthened. Grids are more compact representations than micropolygons, and memory footprints may be improved. Some embodiments of the present invention improve efficiency of tentative hiding of multiple grids. The multiple grids each undergo the first hit testing. Combining grids that may have otherwise occluded each other and would have been needlessly shaded can be avoided. The grids that do not occlude each other may be combined and shaded all at once.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for rendering a plurality of objects, the method comprising:
   receiving at least information associated with a plurality of objects;
   generating a first plurality of geometric primitives based on at least information associated with the plurality of objects;
   generating a first plurality of grids based on at least information associated with the first plurality of geometric primitives;
   shading the first plurality of grids;
   generating an image based on at least information associated with the first plurality of grids;
   wherein the generating a first plurality of grids includes:
      generating a second plurality of grids associated with the first plurality of geometric primitives, the second plurality of grids including a first plurality of micropolygons;
      selecting a third plurality of grids from the second plurality of grids based on at least information associated with the first plurality of micropolygons and a first buffer state related to a buffer, the third plurality of grids including a second plurality of micropolygons, the selecting a third plurality of grids including updating the buffer from the first buffer state to a second buffer state before the shading the first plurality of grids;
      selecting the first plurality of grids from the third plurality of grids based on at least information associated with the second buffer state and the second plurality of micropolygons;
      processing information associated with the second plurality of grids;
      performing displacement shading to the second plurality of grids if a predetermined condition is satisfied,
      wherein the performing displacement shading to the second plurality of grids comprises:
         for each of the second plurality of grids,
            determining whether the displacement shading can be performed independently from surface shading;
            if the displacement shading can be performed independently from the surface shading, performing the displacement shading to the each of the second plurality of grids.

2. A method for rendering a plurality of objects, the method comprising:
   receiving at least information associated with a plurality of objects;
   generating a first plurality of geometric primitives based on at least information associated with the plurality of objects;
   generating a first plurality of grids based on at least information associated with the first plurality of geometric primitives;
   shading the first plurality of grids;
   generating an image based on at least information associated with the first plurality of grids;
   wherein the generating a first plurality of grids includes:
      generating a second plurality of grids associated with the first plurality of geometric primitives, the second plurality of grids including a first plurality of micropolygons;
      selecting a third plurality of grids from the second plurality of grids based on at least information associated with the first plurality of micropolygons and a first buffer state related to a buffer, the third plurality of grids including a second plurality of micropolygons, the selecting a third plurality of grids including updating the buffer from the first buffer state to a second buffer state before the shading the first plurality of grids;
      selecting the first plurality of grids from the third plurality of grids based on at least information associated with the second buffer state and the second plurality of micropolygons;
   selecting a first bucket, the first bucket including a second plurality of geometric primitives, the first plurality of geometric primitives including the second plurality of geometric primitives;
   for each of the second plurality of geometric primitives,
      if a grid corresponding to the each of the second plurality of geometric primitives is free from being one of the first plurality of grids and if the each of the second plurality of geometric primitive or a corresponding grid extends to a second bucket,
      providing information associated with the each of the second plurality of geometric primitives to the second bucket.

3. The method of claim 2 wherein the providing information associated with the each of the second plurality of geometric primitives comprises:
   providing information associated with the corresponding grid to the second bucket.

4. The method of claim 1 wherein the generating a first plurality of grids further comprises:
   selecting a second plurality of geometric primitives from the first plurality of geometric primitives based on at least information associated with the buffer;
   wherein the second plurality of geometric primitives corresponds to the second plurality of grids respectively.

5. The method of claim 4 wherein the selecting the first plurality of grids from the third plurality of grids comprises:
   selecting a fourth plurality of grids from the third plurality of grids based on at least information associated with the second buffer state and the third plurality of grids, the fourth plurality of grids including the second plurality of micropolygons;
   selecting the first plurality of grids from the fourth plurality of grids based on at least information associated with the second buffer state and the second plurality of micropolygons.

6. The method of claim 1 wherein the generating a first plurality of grids further comprises:
   generating a first plurality of bounding boxes associated with the first plurality of geometric primitives respectively based on at least information associated with the first plurality of geometric primitives.

7. The method of claim 1 wherein the generating an image based on at least information of the first plurality of grids comprises selecting the first plurality of grids by updating the buffer from the second buffer state to a third buffer state.

8. The method of claim 7, and further comprising:
   selecting a fourth plurality of grids from the first plurality of grids based on at least information associated with the third buffer state and a third plurality of micropolygons, the first plurality of grids including the third plurality of micropolygons.

9. The method of claim 8, and further comprising:
   obtaining a plurality of samples from a fourth plurality of micropolygons, the fourth plurality of grids including the fourth plurality of micropolygons;
   processing information associated with the plurality of samples;
   generating an image based on at least information associated with the plurality of samples.

10. The image formed according to the method of claim 9.

11. A method for determining visibility of a plurality of objects, the method comprising:
    processing information associated with a first plurality of geometric primitives;
    generating a first plurality of grids associated with the first plurality of geometric primitives, the first plurality of grids including a first plurality of micropolygons;
    processing information associated with the first plurality of grids;
    performing displacement shading to the first plurality of grids if a predetermined condition is satisfied;
    selecting a second plurality of grids from the first plurality of grids based on at least information associated with the first plurality of micropolygons and a first buffer state related to a buffer, the second plurality of grids including a second plurality of micropolygons, the selecting a second plurality of grids including updating the buffer from the first buffer state to a second buffer state before the performing displacement shading;
    selecting a third plurality of grids from the second plurality of grids based on at least information associated with the second buffer state and the second plurality of micropolygons;
    generating an image based on at least information associated with the third plurality of grids
    wherein the performing displacement shading to the second plurality of grids comprises:
    for each of the first plurality of grids,
    determining whether the displacement shading can be performed independently from surface shading;
    if the displacement shading can be performed independently from the surface shading, performing the displacement shading to the each of the first plurality of grids.

12. The method of claim 11, and further comprising selecting a first bucket, the first bucket including the first plurality of geometric primitives.

13. The method of claim 12, and further comprising:
    for each of the first plurality of geometric primitives,
    if a grid corresponding to the each of the first plurality of geometric primitives is free from being one of the third plurality of grids and if the each of the first plurality of geometric primitive or a corresponding grid extends to a second bucket,
    providing information associated with the each of the first plurality of geometric primitives to the second bucket.

14. The method of claim 13 wherein the providing information associated with the each of the first plurality of geometric primitives comprises:
    providing information associated with the corresponding grid to the second bucket.

15. The method of claim 14 wherein the generating a first plurality of grids comprises:
    selecting a second plurality of geometric primitives from the first plurality of geometric primitives based on at least information associated with the buffer;
    wherein the second plurality of geometric primitives corresponds to the first plurality of grids respectively.

16. The method of claim 15 wherein the selecting a third plurality of grids from the second plurality of grids comprises:
    selecting a fourth plurality of grids from the second plurality of grids based on at least information associated with the second buffer state and the second plurality of grids, the fourth plurality of grids including the second plurality of micropolygons;
    selecting the third plurality of grids from the fourth plurality of grids based on at least information associated with the second buffer state and the second plurality of micropolygons.

17. A computer-readable medium including instructions for rendering a plurality of objects, the computer-readable medium comprises:
    one or more instructions for receiving at least information associated with a plurality of objects;
    one or more instructions for generating a first plurality of geometric primitives based on at least information associated with the plurality of objects;
    one or more instructions for generating a first plurality of grids based on at least information associated with the first plurality of geometric primitives;
    one or more instructions for shading the first plurality of grids;
    wherein the one or more instructions for generating a first plurality of grids include:
    one or more instructions for generating a second plurality of grids associated with the first plurality of geometric primitives, the second plurality of grids including a first plurality of micropolygons;
    one or more instructions for selecting a third plurality of grids from the second plurality of grids based on at least information associated with the first plurality of micropolygons and a first buffer state related to a buffer, the third plurality of grids including a second plurality of micropolygons, the one or more instructions for selecting a third plurality of grids including one or more instructions for updating the buffer from the first buffer state to a second buffer state before the shading the first plurality of grids;

one or more instructions for selecting the first plurality of grids from the third plurality of grids based on at least information associated with the second buffer state and the second plurality of micropolygons; and one or more instructions for selecting a second plurality of geometric primitives from the first plurality of geometric primitives based on at least information associated with the buffer;

wherein the second plurality of geometric primitives corresponds to the second plurality of grids respectively.

18. The computer-readable medium of claim 17 wherein one or more instructions for the generating a first plurality of grids further comprise:

one or more instructions for processing information associated with the second plurality of grids;

one or more instructions for performing displacement shading to the second plurality of grids if a predetermined condition is satisfied.

19. A computer-readable medium including instructions for rendering a plurality of objects, the computer-readable medium comprises:

one or more instructions for receiving at least information associated with a plurality of objects;

one or more instructions for generating a first plurality of geometric primitives based on at least information associated with the plurality of objects;

one or more instructions for generating a first plurality of grids based on at least information associated with the first plurality of geometric primitives;

one or more instructions for shading the first plurality of grids;

wherein the one or more instructions for generating a first plurality of grids include:

one or more instructions for generating a second plurality of grids associated with the first plurality of geometric primitives, the second plurality of grids including a first plurality of micropolygons;

one or more instructions for selecting a third plurality of grids from the second plurality of grids based on at least information associated with the first plurality of micropolygons and a first buffer state related to a buffer, the third plurality of grids including a second plurality of micropolygons, the one or more instructions for selecting a third plurality of grids including one or more instructions for updating the buffer from the first buffer state to a second buffer state;

one or more instructions for selecting the first plurality of grids from the third plurality of grids based on at least information associated with the second buffer state and the second plurality of micropolygons;

wherein one or more instructions for the generating a first plurality of grids further comprise:

one or more instructions for processing information associated with the second plurality of grids;

one or more instructions for each of the second plurality of grids, determining whether the displacement shading can be performed independently from surface shading;

if the displacement shading can be performed independently from the surface shading, performing the displacement shading to the each of the second plurality of grids.

20. A computer-readable medium including instructions for rendering a plurality of objects, the computer-readable medium comprises:

one or more instructions for receiving at least information associated with a plurality of objects;

one or more instructions for generating a first plurality of geometric primitives based on at least information associated with the plurality of objects;

one or more instructions for generating a first plurality of grids based on at least information associated with the first plurality of geometric primitives;

one or more instructions for shading the first plurality of grids;

wherein the one or more instructions for generating a first plurality of grids include:

one or more instructions for generating a second plurality of grids associated with the first plurality of geometric primitives, the second plurality of grids including a first plurality of micropolygons;

one or more instructions for selecting a third plurality of grids from the second plurality of grids based on at least information associated with the first plurality of micropolygons and a first buffer state related to a buffer, the third plurality of grids including a second plurality of micropolygons, the one or more instructions for selecting a third plurality of grids including one or more instructions for updating the buffer from the first buffer state to a second buffer state before the shading the first plurality of grids;

one or more instructions for selecting the first plurality of grids from the third plurality of grids based on at least information associated with the second buffer state and the second plurality of micropolygons;

one or more instructions for selecting a first bucket, the first bucket including a second plurality of geometric primitives, the first plurality of geometric primitives including the second plurality of geometric primitives;

one or more instructions for each of the second plurality of geometric primitives, if a grid corresponding to the each of the second plurality of geometric primitives is free from being one of the first plurality of grids and if the each of the second plurality of geometric primitive or a corresponding grid extends to a second bucket, providing information associated with the each of the second plurality of geometric primitives to the second bucket.

21. The computer-readable medium of claim 20 wherein the one or more instructions for providing information associated with the each of the second plurality of geometric primitives comprise:

one or more instructions for providing information associated with the corresponding grid to the second bucket.

22. The computer-readable medium of claim 17 wherein the one or more instructions for selecting the first plurality of grids from the third plurality of grids comprise:

one or more instructions for selecting a fourth plurality of grids from the third plurality of grids based on at least information associated with the second buffer state and the third plurality of grids, the fourth plurality of grids including the second plurality of micropolygons;

one or more instructions for selecting the first plurality of grids from the fourth plurality of grids based on at least information associated with the second buffer state and the second plurality of micropolygons.

23. The computer-readable medium of claim 17 wherein the one or more instructions for generating a first plurality of grids further comprises:
one or more instructions for generating a first plurality of bounding boxes associated with the first plurality of geometric primitives respectively based on at least information associated with the first plurality of geometric primitives.

24. The computer-readable medium of claim 17 wherein the one or more instructions for selecting the first plurality of grids comprise updating the buffer from the second buffer state to a third buffer state.

25. The computer-readable medium of claim 24, and further comprising:
one or more instructions for selecting a fourth plurality of grids from the first plurality of grids based on at least information associated with the third buffer state and a third plurality of micropolygons, the first plurality of grids including the third plurality of micropolygons.

26. The computer-readable medium of claim 25, and further comprising:
one or more instructions for obtaining a plurality of samples from a fourth plurality of micropolygons, the fourth plurality of grids including the fourth plurality of micropolygons;
one or more instructions for processing information associated with the plurality of samples;
one or more instructions for generating an image based on at least information associated with the plurality of samples.

27. A computer-readable medium including instructions for determining visibility of a plurality of objects, the computer-readable medium comprises:
one or more instructions for processing information associated with a first plurality of geometric primitives;
one or more instructions for generating a first plurality of grids associated with the first plurality of geometric primitives, the first plurality of grids including a first plurality of micropolygons;
one or more instructions for processing information associated with the first plurality of grids;
one or more instructions for performing displacement shading to the first plurality of grids if a predetermined condition is satisfied;
one or more instructions for selecting a second plurality of grids from the first plurality of grids based on at least information associated with the first plurality of micropolygons and a first buffer state related to a buffer, the second plurality of grids including a second plurality of micropolygons, the one or more instructions for selecting a second plurality of grids including updating the buffer from the first buffer state to a second buffer state before performing displacement shading;
one or more instructions for selecting a third plurality of grids from the second plurality of grids based on at least information associated with the second buffer state and the second plurality of micropolygons; and
one or more instructions for selecting a first bucket, the first bucket including the first plurality of geometric primitives;
one or more instructions for each of the first plurality of geometric primitives,
if a grid corresponding to the each of the first plurality of geometric primitives is free from being one of the third plurality of grids and if the each of the first plurality of geometric primitive or a corresponding grid extends to a second bucket,
providing information associated with the each of the first plurality of geometric primitives to the second bucket.

28. A computer-readable medium including instructions for determining visibility of a plurality of objects, the computer-readable medium comprises:
one or more instructions for processing information associated with a first plurality of geometric primitives;
one or more instructions for generating a first plurality of grids associated with the first plurality of geometric primitives, the first plurality of grids including a first plurality of micropolygons;
one or more instructions for processing information associated with the first plurality of grids;
one or more instructions for performing displacement shading to the first plurality of grids if a predetermined condition is satisfied;
one or more instructions for selecting a second plurality of grids from the first plurality of grids based on at least information associated with the first plurality of micropolygons and a first buffer state related to a buffer, the second plurality of grids including a second plurality of micropolygons, the one or more instructions for selecting a second plurality of grids including updating the buffer from the first buffer state to a second buffer state;
one or more instructions for selecting a third plurality of grids from the second plurality of grids based on at least information associated with the second buffer state and the second plurality of micropolygons;
wherein the one or more instructions for performing displacement shading to the first plurality of grids comprise:
one or more instructions for each of the first plurality of grids,
determining whether the displacement shading can be performed independently from surface shading;
if the displacement shading can be performed independently from the surface shading, performing the displacement shading to the each of the first plurality of grids.

29. The computer-readable medium of claim 27 wherein the one or more instructions for providing information associated with the each of the first plurality of geometric primitives comprise:
one or more instructions for providing information associated with the corresponding grid to the second bucket.

30. The computer-readable medium of claim 29 wherein the one or more instructions for generating a first plurality of grids comprise:
one or more instructions for selecting a second plurality of geometric primitives from the first plurality of geometric primitives based on at least information associated with the buffer;
wherein the second plurality of geometric primitives corresponds to the first plurality of grids respectively.

31. The computer-readable medium of claim 30 wherein the one or more instructions for selecting a third plurality of grids from the second plurality of grids comprise:
one or more instructions for selecting a fourth plurality of grids from the second plurality of grids based on at least information associated with the second buffer state and the second plurality of grids, the fourth plurality of grids including the second plurality of micropolygons;

one or more instructions for selecting the third plurality of grids from the fourth plurality of grids based on at least information associated with the second buffer state and the second plurality of micropolygons.

32. The computer-readable medium of claim 31, and further comprising:
one or more instructions for processing information associated with the third plurality of grids;
one or more instructions for generating an image based on at least information associated with the third plurality of grids.

33. A system for rendering a plurality of objects, the system comprising:
a processing system configured to:
receive at least information associated with a plurality of objects;
generate a first plurality of geometric primitives based on at least information associated with the plurality of objects;
generate a first plurality of grids based on at least information associated with the first plurality of geometric primitives;
shade the first plurality of grids;
wherein the generate a first plurality of grids includes:
generate a second plurality of grids associated with the first plurality of geometric primitives, the second plurality of grids including a first plurality of micropolygons;
select a third plurality of grids from the second plurality of grids based on at least information associated with the first plurality of micropolygons and a first buffer state related to a buffer, the third plurality of grids including a second plurality of micropolygons, the select a third plurality of grids including updating the buffer from the first buffer state to a second buffer state before shade the first plurality of grids;
select the first plurality of grids from the third plurality of grids based on at least information associated with the second buffer state and the second plurality of micropolygons; and
select a first bucket, the first bucket including a second plurality of geometric primitives, the first plurality of geometric primitives including the second plurality of geometric primitives;
for each of the second plurality of geometric primitives, if a grid corresponding to the each of the second plurality of geometric primitives is free from being one of the first plurality of grids and if the each of the second plurality of geometric primitive or a corresponding grid extends to a second bucket,
provide information associated with the each of the second plurality of geometric primitives to the second bucket.

34. The system of claim 33 wherein the generate a first plurality of grids further comprises:
process information associated with the second plurality of grids;
perform displacement shading to the second plurality of grids if a predetermined condition is satisfied.

35. A system for rendering a plurality of objects, the system comprising:
a processing system configured to:
receive at least information associated with a plurality of objects;
generate a first plurality of geometric primitives based on at least information associated with the plurality of objects;
generate a first plurality of grids based on at least information associated with the first plurality of geometric primitives;
shade the first plurality of grids;
wherein the generate a first plurality of grids includes:
generate a second plurality of grids associated with the first plurality of geometric primitives, the second plurality of grids including a first plurality of micropolygons;
process information associated with the second plurality of grids;
for each of the second plurality of grids,
determine whether the displacement shading can be performed independently from surface shading;
if the displacement shading can be performed independently from the surface shading, perform the displacement shading to the each of the second plurality of grids;
select a third plurality of grids from the second plurality of grids based on at least information associated with the first plurality of micropolygons and a first buffer state related to a buffer, the third plurality of grids including a second plurality of micropolygons, the select a third plurality of grids including update the buffer from the first buffer state to a second buffer state;
select the first plurality of grids from the third plurality of grids based on at least information associated with the second buffer state and the second plurality of micropolygons.

36. The system of claim 33 wherein the provide information associated with the each of the second plurality of geometric primitives comprises:
provide information associated with the corresponding grid to the second bucket.

37. The system of claim 33 wherein the generate a first plurality of grids further comprises:
select a second plurality of geometric primitives from the first plurality of geometric primitives based on at least information associated with the buffer;
wherein the second plurality of geometric primitives corresponds to the second plurality of grids respectively.

38. The system of claim 37 wherein the select the first plurality of grids from the third plurality of grids comprises:
select a fourth plurality of grids from the third plurality of grids based on at least information associated with the second buffer state and the third plurality of grids, the third plurality of grids including the second plurality of micropolygons;
select the first plurality of grids from the fourth plurality of grids based on at least information associated with the second buffer state and the second plurality of micropolygons.

39. A system for determining visibility of a plurality of objects, the system comprising:
a processing system configured to:
process information associated with a first plurality of geometric primitives;
generate a first plurality of grids associated with the first plurality of geometric primitives, the first plurality of grids including a first plurality of micropolygons;
process information associated with the first plurality of grids;
perform displacement shading to the first plurality of grids if a predetermined condition is satisfied;

select a second plurality of grids from the first plurality of grids based on at least information associated with the first plurality of micropolygons and a first buffer state related to a buffer, the second plurality of grids including a second plurality of micropolygons, the select a second plurality of grids including update the buffer from the first buffer state to a second buffer state before perform displacement shading;

select a third plurality of grids from the second plurality of grids based on at least information associated with the second buffer state and the second plurality of micropolygons; and select a first bucket, the first bucket including the first plurality of geometric primitives for each of the first plurality of geometric primitives,
if a grid corresponding to the each of the first plurality of geometric 2primitives is free from being one of the third plurality of grids and if the each of the first plurality of geometric primitive or a corresponding grid extends to a second bucket,
provide information associated with the each of the first plurality of geometric primitives to the second bucket.

40. A system for determining visibility of a plurality of objects, the system comprising:
a processing system configured to:
process information associated with a first plurality of geometric primitives;
generate a first plurality of grids associated with the first plurality of geometric primitives, the first plurality of grids including a first plurality of micropolygons;
process information associated with the first plurality of grids;
perform displacement shading to the first plurality of grids if a predetermined condition is satisfied;
select a second plurality of grids from the first plurality of grids based on at least information associated with the first plurality of micropolygons and a first buffer state related to a buffer, the second plurality of grids including a second plurality of micropolygons, the select a second plurality of grids including update the buffer from the first buffer state to a second buffer state;

select a third plurality of grids from the second plurality of grids based on at least information associated with the second buffer state and the second plurality of micropolygons;
wherein the perform displacement shading to the second plurality of grids comprises:
for each of the first plurality of grids,
determine whether the displacement shading can be performed independently from surface shading;
if the displacement shading can be performed independently from the surface shading, perform the displacement shading to the each of the first plurality of grids.

41. The system of claim 39 wherein the provide information associated with the each of the first plurality of geometric primitives comprises: provide information associated with the corresponding grid to the second bucket.

42. The system of claim 41 wherein the generate a first plurality of grids comprises:
select a second plurality of geometric primitives from the first plurality of geometric primitives based on at least information associated with the buffer;
wherein the second plurality of geometric primitives corresponds to the first plurality of grids respectively.

43. The system of claim 42 wherein the select a third plurality of grids from the second plurality of grids comprises:
select a fourth plurality of grids from the second plurality of grids based on at least information associated with the second buffer state and the second plurality of grids, the fourth plurality of grids including the second plurality of micropolygons;
select the third plurality of grids from the fourth plurality of grids based on at least information associated with the second buffer state and the second plurality of micropolygons.

44. The system of claim 43 wherein the processing system is further configured to:
process information associated with the third plurality of grids;
generate an image based on at least information associated with the third plurality of grids.

* * * * *